(12) United States Patent
Yeh

(10) Patent No.: US 6,294,089 B1
(45) Date of Patent: Sep. 25, 2001

(54) DYNA-MAG ACTIVATOR

(76) Inventor: Chih Chung Yeh, 6f, No. 440-2, Gin Pin Road, Chong Ho City, Taipei Hsien (TW), 235

( * ) Notice: Subject to any disclaimer, the term of this patent is extended or adjusted under 35 U.S.C. 154(b) by 0 days.

(21) Appl. No.: 09/517,086

(22) Filed: Mar. 2, 2000

(51) Int. Cl.[7] .................................................. B01D 35/06
(52) U.S. Cl. .......................................... 210/223; 210/222
(58) Field of Search .................................. 210/222, 223, 210/259, 295

(56) References Cited

U.S. PATENT DOCUMENTS

| | | | |
|---|---|---|---|
| 4,969,437 | * 11/1990 | Noll et al. | 210/223 |
| 5,242,587 | * 9/1993 | Barrington et al. | 210/223 |
| 5,882,514 | * 3/1999 | Fletcher | 210/223 |

* cited by examiner

*Primary Examiner*—David A. Reifsnyder

(57) ABSTRACT

A water filter device includes one or more magnetic devices coupled between one or more filter devices. The magnetic devices each includes a housing having two covers secured to the ends, and one or more tubes received in the housing and secured between the covers with gaskets. One or more magnetic members are received in the tubes for forming one or more water passages in the tubes and for activating the water flowing through the tubes. One or more rings or sealing rings are further engaged with the magnetic members.

2 Claims, 6 Drawing Sheets

DYNA-MAG ACTIVATOR

BACKGROUND OF THE INVENTION

1. Field of the Invention

The present invent ion relates to a dyna-mag activator, and more particularly to a water filter device having one or more magnetic members.

2. Description n of the Prior Art

Typical water filter devices comprise one or more filter screens provided there in for filtering or purifying the water flowing therethrough. No magnetic materials may be used for activating the water.

The present invention has arisen to mitigate and/or obviate the afore-described disadvantages of the conventional water filter devices.

SUMMARY OF THE INVENTION

The primary objective of the present invention is to provide a water filter device having one or more magnetic members for activating the water flowing through the water filter device.

In accordance with one aspect of the invention, there is provided a water filter device comprising a magnetic device including a housing having two ends, two covers secured to the ends of the housing respectively, at least one tube received in the housing and secured between the covers, at least one magnetic member received in the tube for defining at least one water passage in the tube and for allowing water to flow through the water passage. One or more filter devices are further coupled to one of the covers.

One or more rings are further disposed beside the magnetic member, and one or more sealing rings are disposed in the water passage and engaged with the tube.

Two covers are secured to the ends of the housing respectively, The covers each includes a gasket engaged therein and having an opening for receiving the tube. The covers each includes a mouth provided therein, the magnetic device further includes two caps secured to the mouths of the covers respectively and each having a hole formed therein for allowing the water to flow into the tube via the hole of the cap. The caps each includes a filter screen provided therein for blocking the hole of the cap.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
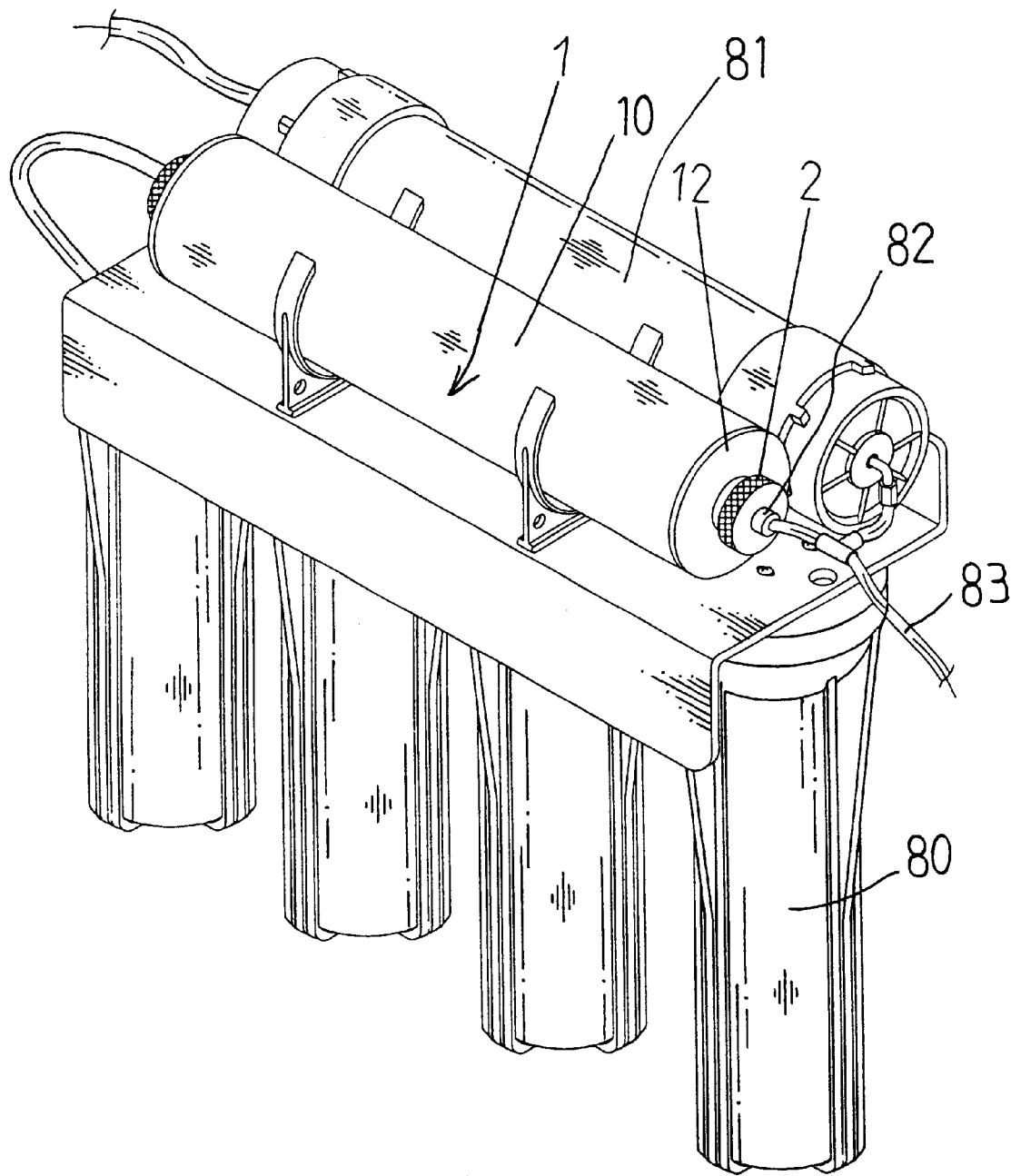
FIG. 1 is a perspective view of a water filter device in accordance with the present invention.
Figures 2, 3:
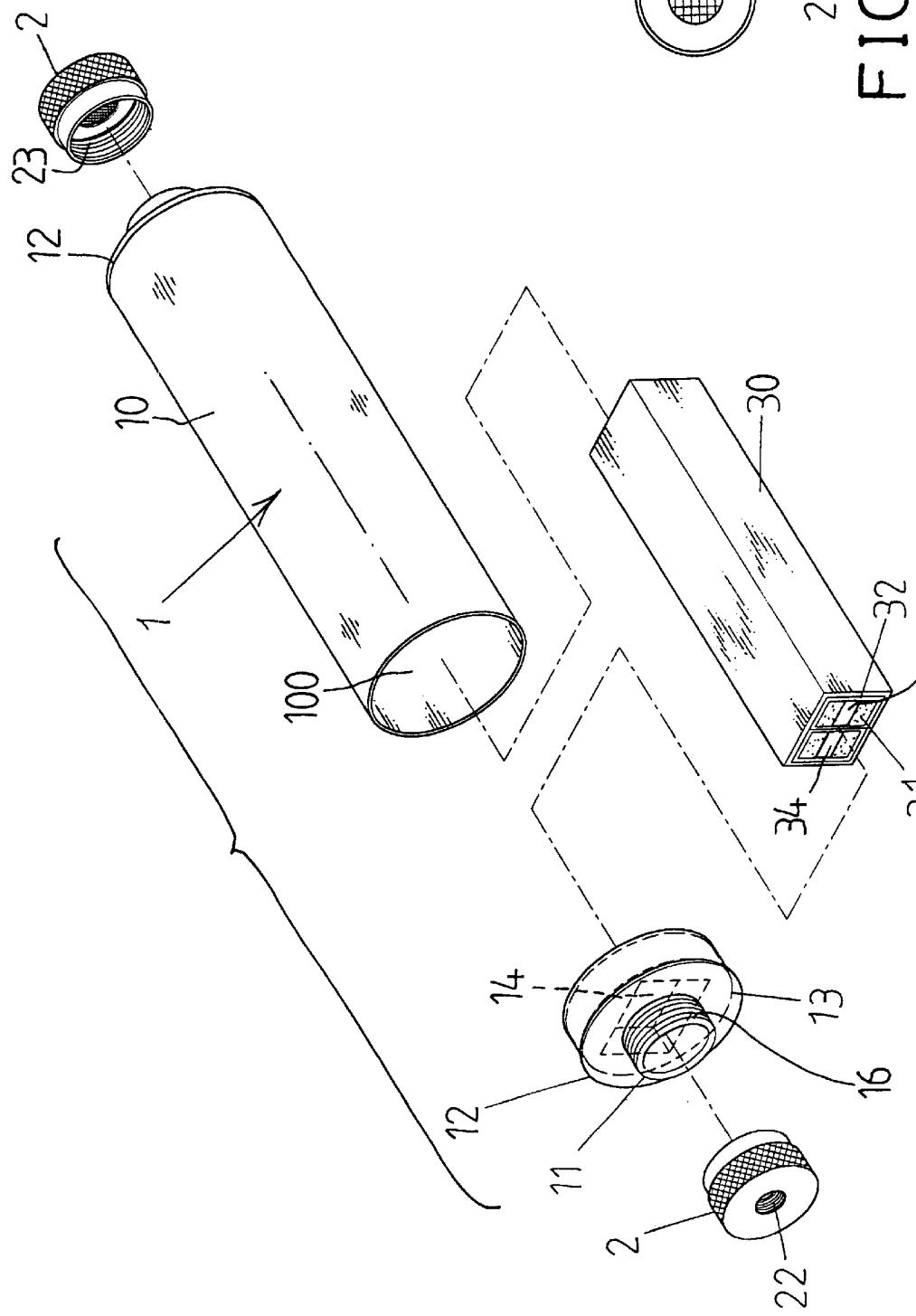
FIG. 2 is an exploded view of a magnetic device.
FIG. 3 is an end view of a cap of the magnetic device.
Figure 4:
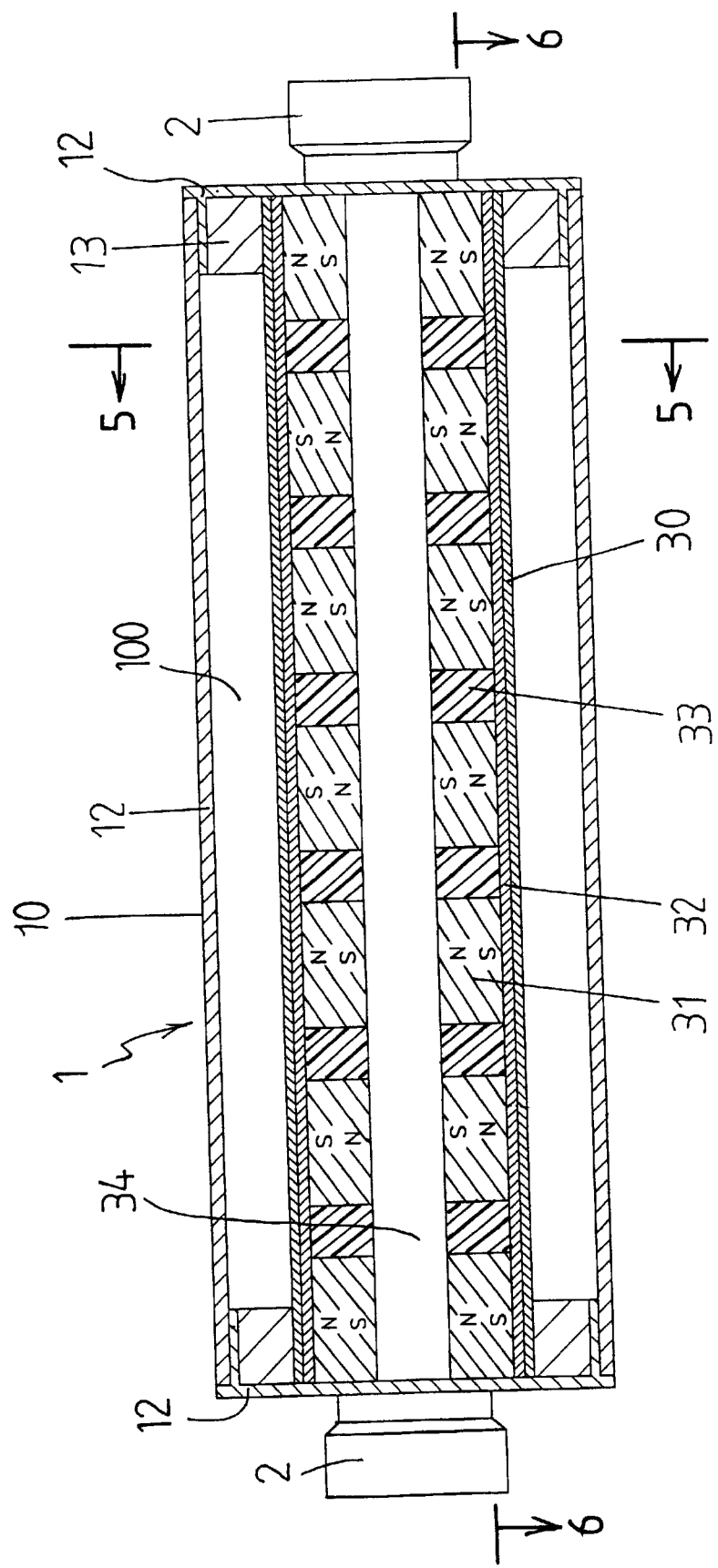
FIG. 4 is a cross sectional view taken along lines 4—4 of FIG. 5.

Referring to the drawings, and initially to FIG. 1, a dyna-mag activator in accordance with the present invention is particularly provided for a water filter device and comprises one or more containers 80, 81 coupled together in series and/or in parallel with each other with hoses 83 and each having a typical filter member provided therein for filtering the water flowing therethrough. The water filter device includes a magnetic device 1 coupled between the containers 80, 81 for receiving and for activating the water therethrough.

Referring next to FIGS. 2–6, the magnetic device 1 includes a housing 10, such as a cylindrical housing 10, having a chamber 100 formed therein and having two ends each having a cover 12 attached thereto and secured thereto by such as adhesive materials or by force-fitted engagements or by welding processes or the like. The covers 12 each includes a mouth 11 having an outer thread 16 formed thereon, and each includes a gasket 13 disposed therein and having an opening 14 formed therein, such as a square or a non-circular opening formed therein. Two caps 2 each includes an inner thread 23 formed therein for threading with the outer threads 16 of the covers 12 and for securing to the covers 12. The caps 2 each includes an orifice or a screw hole 22 formed therein for receiving couplers 82 that are coupled to the hoses 83 and for allowing the water from the hoses 83 to flow into the chamber 100 of the housing 10. The caps 2 each includes a filter screen 21 (FIG. 3) provided therein and blocking the screw hole 22 for filtering the water flowing through the caps 2.

Figure 5:
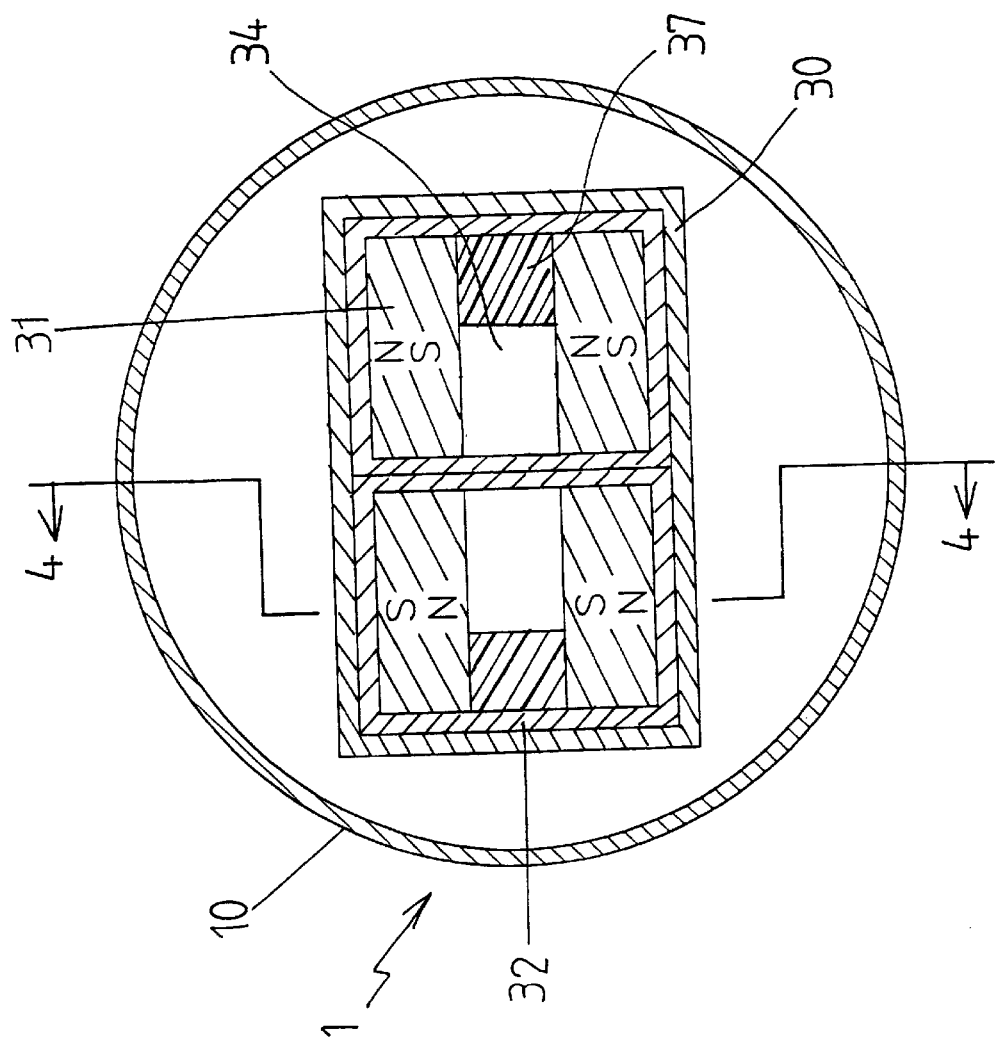
FIG. 5 is a cross sectional view taken along lines 5—5 of FIG. 4.
Figure 6:
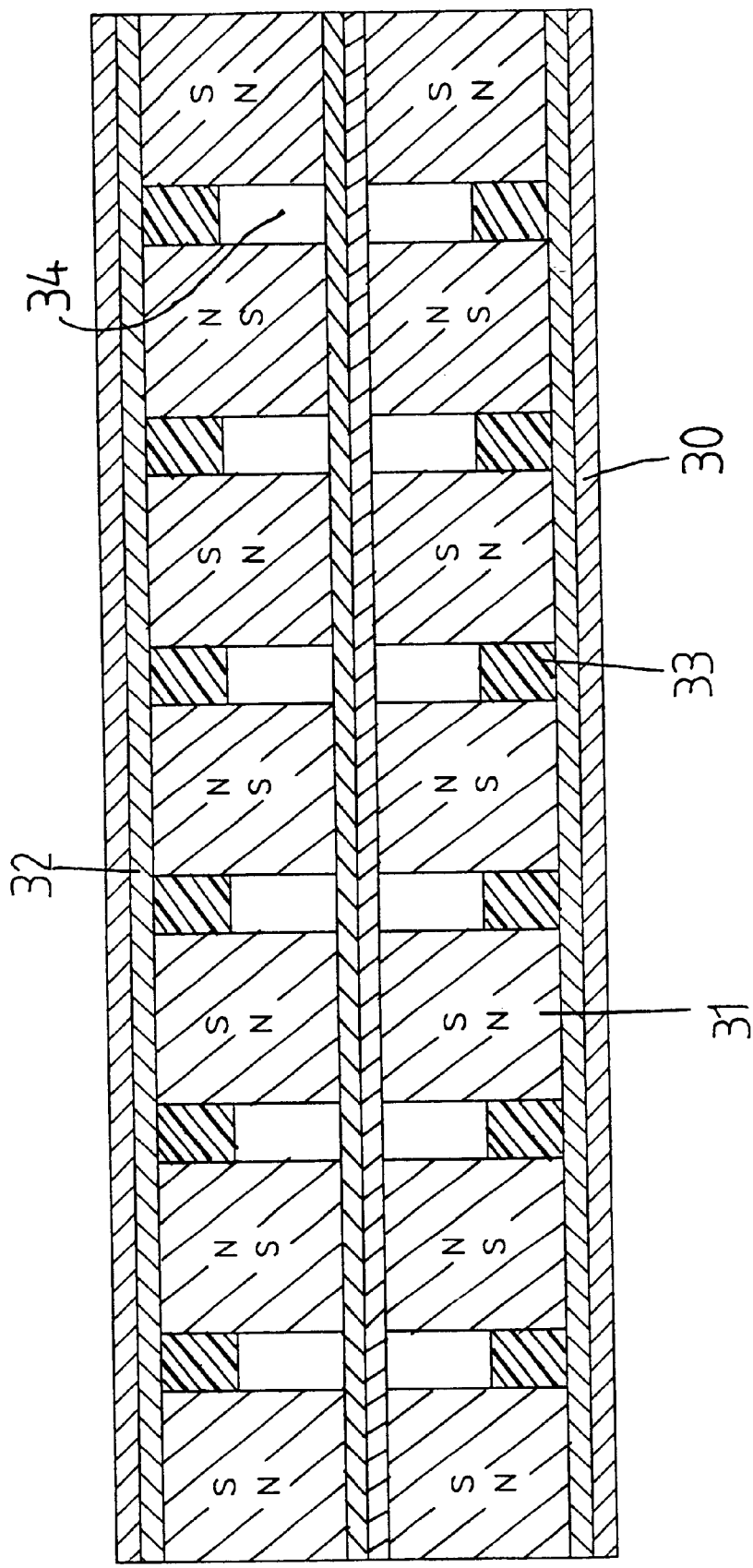
FIG. 6 is a cross sectional view taken along lines 6—6 of FIG. 4.
Figure 7:
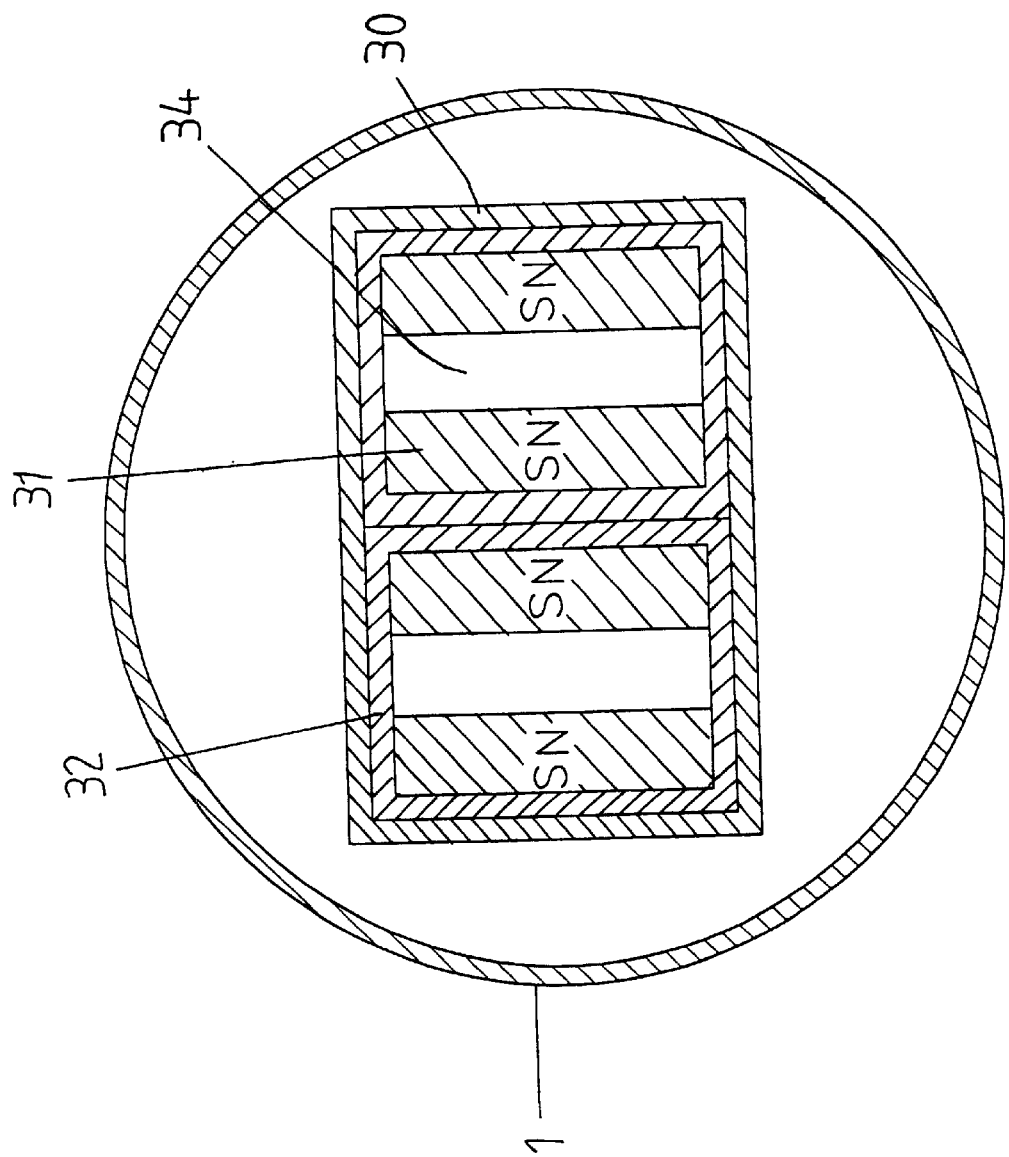
FIG. 7 is a cross sectional view similar to FIG. 5, illustrating the other application of the magnetic device.

A casing 30 has two ends engaged in the openings 14 of the gaskets 13 such that the casing 30 may be secured in the housing 10. One or more tubes 32 are received in the casing 30. The casing 30 and the tubes 32 are preferably made of metal or magnetic or magnetizable materials. One or more magnetic members 31 are received in the tubes 32, and one or more gaskets or resilient or rubber rings 33 are engaged between the adjacent magnetic members 31. The magnetic members 31 and/or the rings 33 each includes a bore formed therein for forming a water passage 34 in each of the tubes 32 and for receiving the water from the hoses 83. As best shown in FIG. 5, one or more sealing rings 37 are further provided and engaged in the respective water passages 34 and engaged with the tubes 32 for separating the tubes 32 from the water and for preventing the tubes 32 from being rusted by the water. As shown in FIG. 7, the magnetic members 31 may be arranged in the other directions or positions.

Either or all of the water passages 34 of the tubes 32 are communicating with the mouths 11 of the covers 12 such that the water may flow through the tubes 32 and may be activated by the magnetic members 31. The magnetic members 31 are preferably made of rare earth and permanent magnetic materials which may change the hydrogen bonding of the water and which may change the water density and the permeability.

Accordingly, the water filter device in accordance with the present invention includes one or more magnetic members for activating the water flowing through the water filter device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:
1. A magnetic device comprising:
a) a housing including two ends,
b) two covers secured to said ends of said housing respectively, said two covers each including a mouth provided therein,
c) at least one tube received in said housing and secured between said two covers,
d) at least two magnetic members received in said at least one tube and spaced from each other for defining at least one water passage between said at least two magnetic members and for allowing water to flow through said at least one water passage, and
e) two caps secured to said mouths of said two covers respectively and each cap having a hole formed therein for allowing the water to flow into said at least one tube via said hole of said two caps.

2. The magnetic device according to claim 1, wherein said two caps each includes a filter screen provided therein for blocking said holes of said two caps.

* * * * *